July 28, 1953     G. E. READ     2,646,974
APPARATUS FOR MAKING REFRIGERATED COMESTIBLES
Filed Sept. 11, 1950
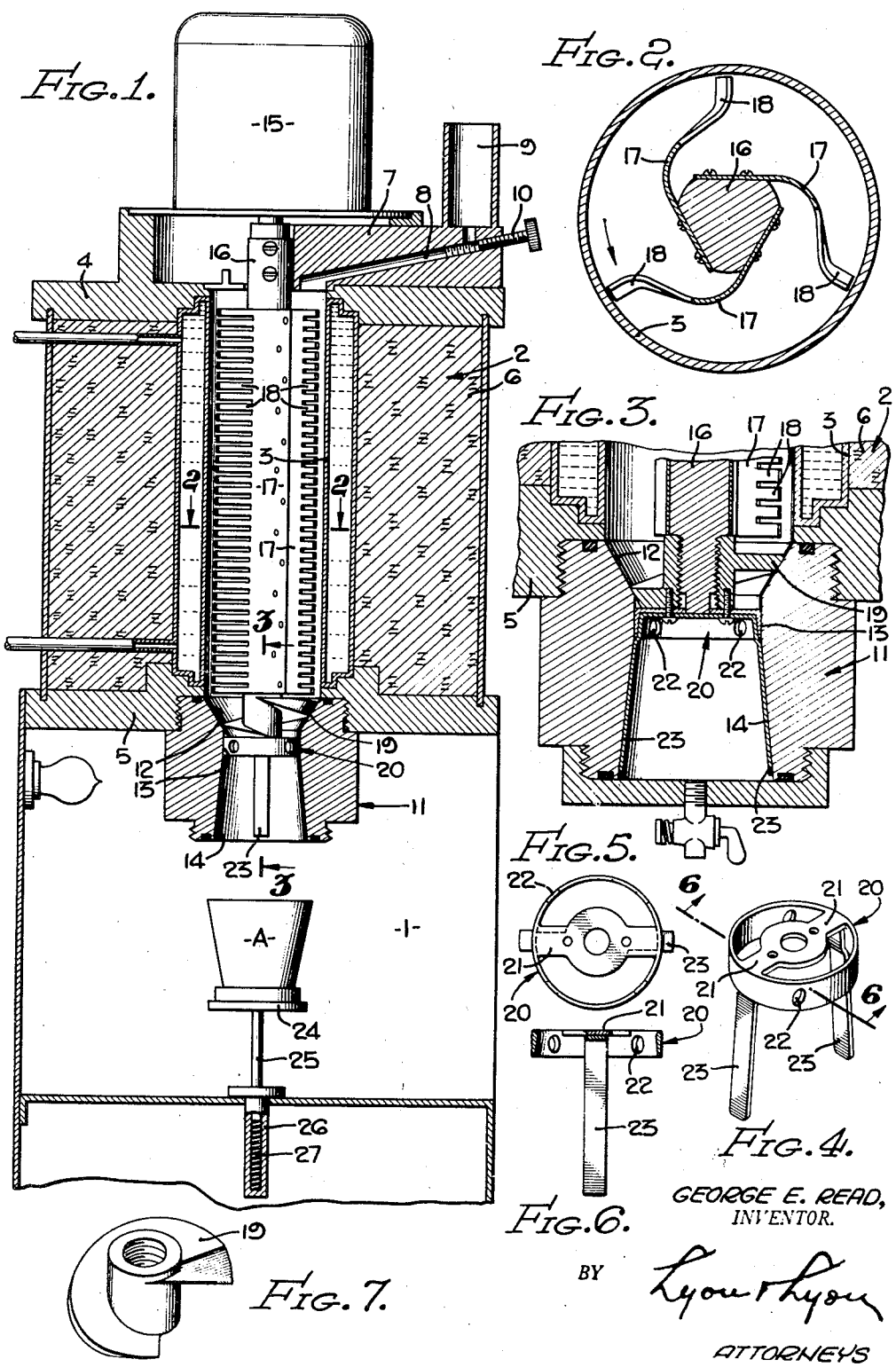
GEORGE E. READ,
INVENTOR.
BY Lyon & Lyon
ATTORNEYS Patented July 28, 1953

2,646,974

UNITED STATES PATENT OFFICE 2,646,974

APPARATUS FOR MAKING REFRIGERATED COMESTIBLES

George E. Read, Santa Monica, Calif.

Application September 11, 1950, Serial No. 184,144

9 Claims. (Cl. 259—8)

My invention relates to means for making refrigerated comestibles, and included in the objects of my invention are:

First, to provide means of this class which incorporates the advantages and overcomes certain difficulties found in the method and apparatus described in the following patents, issued to Edward E. Lindsey, Nos. 2,272,715, 2,304,579, and 2,282,662.

Second, to provide means of this class which produces within a few seconds a serving of frozen comestible from fruit juice, syrup, milk, cream, or mixtures thereof, and which is automatically cleaned on the completion of each serving to such an extent that servings of different flavors or mixtures may be introduced in succession without one flavor or mixture influencing the succeeding flavor.

Third, to provide means of this class wherein liquid is introduced into a vertical cylinder, the walls of which are supercooled; the liquid being engaged by special beating and scraping blades acting in conjunction with the supercooled surface to produce frozen flakes.

Fourth, to provide a means of this class wherein a central depending shaft is employed to drive the beating and scraping blades, and a novel bottom bearing maintains the shaft centered and prevents vibration or displacement of the shaft when subjected to the uneven load imposed by the passing material, this being accomplished without interfering with the discharge of the frozen material, the bearing being so arranged as to be lubricated by the passing material.

Fifth, to provide a means of this class wherein the discharged material may be packed directly into a container and shaped into neat and attractive form ready for serving without further processing.

Sixth, to provide a means of this class which is inherently sanitary as the various parts contacted by the material may be readily separated for cleaning.

With the above and other objects in view, as will appear hereinafter, reference is made to the accompanying drawings in which:

Figure 1 is a longitudinal sectional view of the apparatus employed in the manufacture of a frozen comestible.

Figure 2 is an enlarged transverse sectional view through 2—2 of Figure 1.

Figure 3 is an enlarged fragmentary sectional view taken through 3—3 of Figure 1.

Figure 4 is a perspective view of the lower bearing and wiping fingers.

Figure 5 is a top or plan view thereof; and

Figure 6 is a sectional view thereof taken through 6—6 of Figure 4.

Figure 7 is a perspective view of the packing helix member.

My apparatus for making refrigerated comestibles is contained within a housing structure which comprises in part a serving section 1 which is closed at its back and sides but opened toward the front. Above the serving section is a freezing section 2 in which is centered a vertically disposed freezing cylinder 3. The freezing cylinder is double walled to provide an annular chamber with appropriate baffles and connected by a supply and return line to a refrigerating apparatus, not shown. The freezing cylinder is mounted between end plates 4 and 5, preferably formed of heat insulating material. The freezing cylinder is surrounded by insulation 6.

Mounted on the upper end of the plate 4 is a supply block 7 and a passage 8 sloping downwardly from the front end of the block and discharged into the freezing cylinder 3. The passage 8 communicates with the bottom of a cup 9 intended to receive the liquid serving to be frozen. The passage 8 is provided with a meter valve 10 for throttling the passage and regulating the flow of liquid.

Screw threaded into the lower end plate in a concentric relation with the freezing cylinder is a discharge collar 11. The discharge collar includes converging upper portion 12, a cylinder bearing portion 13, and a slightly diverging lower portion 14.

Supported by the upper plate 4 is a motor 15 to which is attached a shaft 16 extending centrally in the freezing cylinder 3. Secured to the shaft 16 are several sheet metal strips, in this case three, which form scraper blades 17. The extremities of the scraper blades are separated to form resilient scraping fingers 18. The scraper blades and their fingers curve backwardly with respect to their direction of rotation and extremities of the fingers are bent radially and terminate in close proximity to the freezing surface 3. It is preferred that the fingers do not actually touch the surface of the cylinder. The extremities of the fingers are preferably twisted so that their surfaces are directed downwardly with respect to their direction of rotation at an angle of approximately 20° to the vertical. The root portions of the fingers are likewise twisted slightly, preferably about 15° to the vertical.

The lower end of the shaft 16 is connected to a packing helix 19. The packing helix fits the converging portion 12 of the discharge collar 11. Secured below the packing helix 19 is a lower journal ring 20 which rides in the bearing portion 13 of the collar. The bearing ring is provided with a transverse web 21 to permit attachment to the shaft and packing helix. The periphery of the ring at 20 is provided with openings 22. Attached to the journal ring is a pair of thin flexible wiping fingers 23 which ride against the surface of the diverging lower portion of the collar 11.

The discharge collar is directed into the serving section 1 of the housing structure. Mounted below the collar 11 is a receptacle base 24 which is adapted to receive a cup or dish A. It is preferred to use a cup or dish, the mouth of which is larger than the discharge end of the collar 11, so that it may be seated against the collar and receive frozen material as it is discharged therefrom. The receptacle base is mounted on a stem 25 which fits into a socket 26 and is supported by a spring 27 so that a receptacle carried by the base 24 is upwardly urged into contact with the discharge collar 11.

Operation of my comestible making apparatus is as follows: The liquid to be frozen, which may be syrup, milk, cream, fruit juice, or the like, is introduced in through the cup 9 into the freezing cylinder 3. The blades 17 which rotate rapidly engage the stream of liquid and throw it centrifugally against the supercooled walls of the freezing cylinder. The temperature of these walls may be 40 to 60° F. below zero. The material is deposited on the surface, scraped therefrom, and redeposited a number of times as the material moves from the upper to the lower end of the freezing cylinder. In the course of this movement, the material is thoroughly frozen, aerated and is flaky in form. The frozen flakes of material are partially compacted by the helix 19 and delivered through the lower journal ring 20. The initial portion of the serving delivered through the freezing cylinder, is deposited in a receptacle held in contact with the discharged collar by the receptacle base 24. The final portion of the serving remains in the diverging portion of the collar, and is shaped by the wiping fingers 23 to form an attractive projecting portion above the receptacle when the receptacle is removed from the machine.

The lower journal ring plays an important part in the successful operation of the scraper blades. Without this bearing, it is virtually impossible to prevent undue vibration of the shaft and scraper blades. On the other hand, the journal ring offers a minimum interference with the passage of material, in fact, the passing material itself serves as a lubricant for the journal and is applied against the walls of the collar in part at least through the openings 22.

The packing helix operating in conjunction with the wiping fingers 23, aids in providing a comestible of pleasing firmness and consistency.

It has been found advisable to form the collar 11, as well as the packing helix 19, of transparent "Lucite" (methyl-methacrylate) or similar material, suitable for the end plugs 4 and 5 and the supply plug 7. "Nylon" is particularly effective material for the collar 11 as an insert therein to form a bearing for the journal ring 20.

Having fully described my invention, it is to be understood that I do not wish to be limited to the details herein set forth, but my invention is of the full scope of the appended claims.

I claim:

1. An apparatus for manufacturing a frozen comestible, involving: a vertically disposed freezing cylinder; a discharge collar at the lower end thereof; a motor mounted above said freezing cylinder; a drive shaft depending from said motor through said cylinder; a hollow journal ring connected to said drive shaft to rotate therewith and bearing against the walls of said discharge collar for restraining the extended lower end of said shaft against vibration, said journal ring being exposed to and lubricated by material passing through said discharge collar; combined scraper and impeller blades carried by said shaft, and means for introducing a liquid into the upper end of said cylinder for engagement by said blades.

2. In a device for freezing liquid material: a cylinder having a smooth inner surface, said surface being adapted to be cooled below the freezing point of said liquid; means for introducing said liquid into the interior of said cylinder; rotating means operating on said material while in said cylinder, said rotating means including a motor above said cylinder, a shaft depending therefrom through said cylinder, a plurality of resilient blades attached to said shaft and extending toward said surface in a rearwardly tangential direction with respect to the direction of rotation of said rotating means, and terminating adjacent but not touching said surface; a discharge throat at the lower end of said cylinder; and a hollow journal ring connected with said drive shaft to rotate therewith and bearing against the walls of said throat for restraining the lower end of said shaft against vibration.

3. In a device for producing frozen and chilled comestibles including in combination: a refrigerated chamber having a refrigerated wall; a material supply source, means for supplying material to be treated to said chamber; rotatable means within said chamber comprising outwardly extending fingers or blades for delivering said material in finely divided form to said refrigerated wall and removing it therefrom, said means likewise acting to whip, aerate and move the material through said chamber; a discharge throat for said chamber; a rotatable helical discharge blade at the entrance to said throat from said chamber; and wiping fingers extending axially along the walls of said throat at its discharge end and rotatable in contiguous relation thereto, said discharge plate and wiping fingers being attached to said rotatable means.

4. In a device for producing frozen and chilled comestibles including in combination: a refrigerated chamber having a refrigerated wall, a material supply source, means for supplying material to be treated to said chamber; rotatable means within said chamber comprising outwardly extending fingers or blades for delivering said material in finely divided form to said refrigerated wall and removing it therefrom, said means likewise acting to whip, aerate and move the material through said chamber; a discharge throat for said chamber having a converging entrance portion, and a diverging discharge portion; screw means in the entrance portion of said throat for advancing material from said chamber through said throat; means for placing a receptacle under said throat to receive said material and retain excess material in the diverging portion of said throat; and wiping means extending axially along the diverging walls of said throat and rotatable in contiguous relation therewith to shape the excess material therein and separate said material from said diverging walls for removal with said receptacle, said screw means and said wiping means being rotated by said rotatable means.

5. An apparatus for manufacturing a frozen comestible, involving: a vertically disposed freezing chamber adapted to receive a liquid comestible material to be frozen; a discharge throat at the lower end of said chamber having a converging entrance portion and a diverging discharge portion; a motor mounted above said chamber; a shaft depending through said chamber; combined scraper and impeller blades on said shaft coacting with the walls of said freezing chamber for impelling scraping and mixing said material to form frozen flakes; screw means in the entrance portion of said throat for advancing said material therethrough; means for placing a receptacle under said throat to receive said material and retain excess material in the diverging portion of said throat; and wiping means extending axially along the diverging walls of said throat and rotatable in contiguous relation therewith to shape the excess material therein and separate said material from said diverging walls for removal with said receptacle, said screw means and said wiping means being driven by said shaft.

6. Means for freezing or chilling a confection material comprising: a chamber provided with a surface adapted to be refrigerated; means for refrigerating said surface; means for continuously and simultaneously breaking up into finely divided form and distributing said material on said surface and successively scraping it therefrom, breaking it up and redistributing it thereon to thoroughly beat and aerate said material; a discharge throat for said chamber having a converging entrance portion, and a diverging discharge portion; screw means in the entrance portion of said throat for advancing material from said chamber through said throat; means for placing a receptacle under said throat to receive said material and retain excess material in the diverging portion of said throat; and wiping means extending axially along the diverging walls of said throat and rotatable in contiguous relation therewith to shape the excess material thereon and separate said material from said diverging walls for removal with said receptacle, and drive means for rotating said screw means and wiping means.

7. An apparatus for manufacturing a frozen comestible, involving: a vertically disposed freezing chamber adapted to receive a liquid comestible material to be frozen; a discharge throat at the lower end of said chamber having a converging entrance portion and a diverging discharge portion; a motor mounted above said chamber; a shaft depending through said chamber; combined scraper and impeller blades on said shaft coacting with the walls of said freezing chamber for impelling scraping and mixing said material to form frozen flakes; screw means in the entrance portion of said throat for advancing said material therethrough; means for placing a receptacle under said throat to receive said material and retain excess material in the diverging portion of said throat; and wiping means extending axially along the diverging walls of said throat and rotatable in contiguous relation therewith to shape the excess material therein and separate said material from said diverging walls for removal with said receptacle; and a journal ring disposed between said screw means and wiping fingers, and bearing against the walls of said throat to restrain said shaft against vibration, said journal ring being exposed to and lubricated by material passing through said throat, said screw means, wiping means and journal ring all being supported from and rotatable by said shaft.

8. An apparatus for manufacturing a frozen comestible, comprising: a vertically disposed freezing cylinder; a motor mounted above said freezing cylinder; a drive shaft depending from said motor through said cylinder; combined scraper and impeller blades carried by said shaft; a discharge throat member at the bottom of said cylinder in concentric relation therewith and having an annular bearing surface; a journal ring carried by said shaft to rotate therewith in cooperation with said bearing surface to maintain the lower end of said shaft concentric with said freezing cylinder, said journal ring defining rotating discharge ports for the contents of said freezing cylinder.

9. An apparatus for manufacturing frozen comestibles as set forth in claim 8 wherein the upper end of said throat is tapered, and a helical screw member is carried by said shaft within said throat and is provided with a tapered periphery conforming to said tapered portion, thereby to force the contents of said freezing cylinder through the ports in said journal ring.

GEORGE E. READ.

References Cited in the file of this patent

UNITED STATES PATENTS

| Number | Name | Date |
|---|---|---|
| 860,828 | Schafer | July 23, 1907 |
| 1,915,634 | Vogt | June 27, 1933 |
| 2,272,715 | Lindsey | Feb. 10, 1942 |
| 2,282,662 | Lindsey | May 12, 1942 |
| 2,304,579 | Lindsey | Dec. 8, 1942 |
| 2,317,624 | Lindsey | Apr. 27, 1943 |
| 2,415,585 | Genova | Feb. 11, 1947 |
| 2,446,066 | Tate | July 27, 1948 |
| 2,527,894 | Tachella | Oct. 31, 1950 |